UNITED STATES PATENT OFFICE.

CARRIE B. HUNTER, OF BESSEMER, ALABAMA.

ADHESIVE.

1,035,090.

Specification of Letters Patent.

Patented Aug. 6, 1912.

No Drawing.

Application filed March 13, 1912. Serial No. 683,531.

*To all whom it may concern:*

Be it known that I, CARRIE B. HUNTER, a citizen of the United States, residing at Bessemer, in the county of Jefferson and State of Alabama, have invented certain new and useful Improvements in Adhesives, of which the following is a specification.

The present invention relates to adhesives, and to a process for preparing the same, and the invention particularly consists of a composition consisting of the ingredients hereinafter set forth, suitable for use in mending all kinds of china ware, porcelain, glass, and leather.

The object of my invention is to produce an adhesive for the purpose above named, which can be compounded by employing only inexpensive materials, which will set quickly when applied for use, will resist the action of water and heat, and which will not crack when hard.

The constituent ingredients of the adhesive are as follows, the first three named serving as the foundation sticky mixture, and the remaining compounds being employed for purposes hereinafter described:— acetic acid, water, isinglass, plaster of Paris, common salt, and sulfate of zinc.

I have discovered that a mixture of plaster of Paris, common salt, and sulfate of zinc, added to isinglass dissolved in acetic acid and water, causes such an adhesive formed by the three substances last named, to set quickly when the adhesive is applied to the article which it is desired to mend. Furthermore I have found that plaster of Paris and sulfate of zinc added to such an adhesive mixture causes the same when applied to resist the action of water and heat. I have also found that a gelatinous material, such as isinglass, will not crack when hardened when sulfate of zinc is added thereto.

I will now proceed to describe the exact manner in which the constituent ingredients of the adhesive forming the present invention are compounded. To a quantity of glacial acetic acid of 99%, I add 50% of water, after which I heat the resulting liquid to a temperature of 160 degrees F. I then compound a mixture consisting of two parts plaster of Paris, two parts sulfate of zinc, and one part common salt. I mix these last named substances to a batter with some of the liquid consisting of the acetic acid and water. This batter is then added to the rest of the liquid, at the same time stirring the mixture, the quantity of the mixture of plaster of Paris, sulfate of zinc, and common salt used being about ¼ of a pound to each gallon of liquid. To the liquid to which said mixture has been added, I then add about 4½ pounds of French isinglass to every gallon of liquid, stirring the liquid as the isinglass is added. The adhesive produced in this manner will now be ready for use. The isinglass dissolves in the acetic acid, and thus the main adhesive body is formed. The mixture of plaster of Paris, salt, and sulfate of zinc causes the adhesive to set quickly when applied for use, and I have found an especially advantageous action in this regard when these substances are used in substantially the proportions set forth. The plaster of Paris and the sulfate of zinc render the adhesive water-resisting and enable it to withstand the action of heat, and the sulfate of zinc has the property of preventing the adhesive from cracking when it has hardened. These properties of the materials named have not been known heretofore.

The adhesive formed according to the present invention is excellent for securing together the parts of broken china and glass ware, porcelain, leather, and materials of like nature.

Having thus described the said invention, what is claimed as new is:—

1. An adhesive compound consisting of acetic acid, water, isinglass, plaster of Paris, sulfate of zinc, and common salt.

2. An adhesive compound consisting of relatively large quantities of acetic acid, isinglass, and water, and containing relatively small quantities of a mixture consisting of two parts of plaster of Paris, two parts sulfate of zinc, and one part common salt.

3. An adhesive compound consisting of the following constituent ingredients:— acetic acid of 99% water, isinglass, plaster of Paris, sulfate of zinc, and common salt, in the proportions of ¼ pound of the three last named ingredients and 4½ pounds of isinglass to substantially one gallon of acetic acid and water.

4. Process of producing an adhesive compound, which consists in adding water to acetic acid, heating the liquid, then forming a mixture consisting of plaster of Paris, sulfate of zinc, and common salt, and adding the same to the liquid while stirring, and then adding isinglass to the liquid while stirring.

5. Process of producing an adhesive compound which consists in adding water to strong acetic acid, heating the mixture to a temperature of about 160 degrees F., then forming a mixture consisting of substantially two parts plaster of Paris, two parts sulfate of zinc, and one part common salt, mixing the same to a batter with a portion of the liquid before referred to, then adding said batter to the liquid at the same time stirring the same, then adding about $4\frac{1}{2}$ pounds of isinglass to every gallon of the liquid so formed and stirring the same.

In testimony whereof I affix my signature in presence of two witnesses.

CARRIE B. HUNTER.

Witnesses:
  H. C. WALLER,
  H. L. HUNTER.